United States Patent Office 3,356,699
Patented Dec. 5, 1967

3,356,699
ALKALI ISOMERIZATION OF CREPENYNIC ACID TO 8,10,12-OCTADECATRIENOIC ACID
Marvin O. Bagby, Morton, and Kenneth L. Mikolajczak, Peoria, Ill., assignors to the United States of America as represented by the Secretary of Agriculture
No Drawing. Filed June 9, 1965, Ser. No. 462,759
2 Claims. (Cl. 260—405.6)

ABSTRACT OF THE DISCLOSURE

Alkali isomerization of crepenynic acid, i.e., cis-9-octadecen-12-ynoic acid, a major constituent of the seed oil of *Crepis foetida*, results successfully in the formation of a conjugated ene-allenic intermediate, namely, cis-9,11,12-octadecatrienoic acid that on heating at 100° C. forms a recoverable 2:1 mixture consisting of trans,cis,trans- and trans,cis,cis-8,10,12-octadecatrienoic acids, which mixture even in the absence of alkali cyclizes at about 180° C. to provide high yields of the mixed $C_{18}$ cyclohexadiene monocarboxylic acid isomers essentially free of cyclic acid polymer.

---

A nonexclusive, irrevocable, royalty-free license in the invention herein described, throughout the world for all purposes of the United States Government, with the power to grant sublicenses for such purposes, is hereby granted to the Government of the United States of America.

This invention relates mainly to a process for obtaining from an unobvious source greatly improved yields of a hereinafter identified prior art $C_{18}$ cyclic acid mixture of isomers and to a novel intermediate.

More particularly, this invention relates to a process for obtaining very high yields of isomeric $C_{18}$ vicinally disubstituted cyclohexadiene type monocarboxylic acids from a recently discovered acetylenic acid, namely cis-9-octadecen-12-ynoic acid which is a major constituent of the vegetable oils present in the seeds of *Crepis foetida* and to a smaller extent in the oil of *Helichrysum bracteatum* (strawflower), the said acetylenic acid having the formula

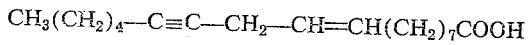

$$CH_3(CH_2)_4-C\equiv C-CH_2-CH=CH(CH_2)_7COOH$$

The said cyclohexadiene type monocarboxylic acid monomers, for brevity called $C_{18}$ cyclic acids, are well known, as see Scholfield et al., U.S. Patent No. 3,041,360 and Friedrich et al., JAOCS 40:584 (1963), wherein it is shown that the cyclic acids are obtained in yields of about 40 percent of theory by an extended alkali fusion and isomerization of linolenic acid in the presence of ethylene glycol. The $C_{18}$ cyclic acids are readily hydrogenated and are then especially valuable intermediates for the preparation of a wide variety of useful products, e.g., for the vinyl-plasticizing amines taught and claimed in copending application S.N. 178,513 of De Jarlais, filed Apr. 8, 1962, and now abandoned, and for the extreme cold weather ester type lubricants that are taught and claimed in copending application S.N. 449,652 of Friedrich, filed Apr. 20, 1965.

Crepenynic acid, i.e., cis-9-octadecen-12-ynoic acid, obtained from the seed oil of *Crepis foetida*, a plant similar to the dandelion and native to Turkey, has been described in the literature, Mikolajczak et al., J. Org. Chem. 29:318 (1964). Crepenynic acid is a positional and geometric isomer of ximenynic acid, i.e., trans-11-octadecen-9-ynoic acid, which in alkali undergoes limited (27%) isomerization to a mixture of acyclic conjugated octadecatrienoic acids, Ligthelm et al., J. Chem. Soc. 1088 (1952).

The discoveries comprising the present invention arose from our desire to account for the disconcerting failure of subsequent gas-liquid chromatographic analyses of the Crepis-derived mixed fatty acid methyl esters to show any of the apparent 88 percent linolenic acid content indicated by the U.V. absorption values on the alkali-isomerized oil (Official and Tentative Methods, American Oil Chemists Society (1959)). Accordingly, we subjected pure methyl crepenynate, i.e., the then unknown unconjugated methyl cis-9-octadecen-12-ynoic acid to progressively-sampled treatment with excess alkali in the presence of ethylene glycol.

The essence of our invention is the unobvious discovery that unlike the limited alkali-rearrangement (27 percent) of the isomeric ximenynic acid (trans-11-octadecen-9-ynoic acid) to heptadecatriene-1-carboxylic acids, crepenynic acid even under extremely mild conditions rapidly isomerizes first to a conjugated ene-allenic acid at room temperature and then at about 100° C. to a recoverable approximately 2:1 mixture of trans-8, cis-10, trans-12-octadecatrienoic acid and trans-8, cis-10, cis-12-octadecatrienoic acid, which mixture then with only a slight further increase in temperature undergoes cyclization to the previously described $C_{18}$ cyclic acids in very high yields. The infrared spectrum of the ene-allenic acid shows allenic absorption at 1,935 cm.$^{-1}$ and a band at 875 cm.$^{-1}$ indicating the presence of an allenic group conjugated with a double bond. The I.R. spectrum of the mixed octadecatrienoic acids shows a strong band at 960 cm.$^{-1}$ and no absorption near 990 cm.$^{-1}$ indicating the absence of two adjacent trans double bonds.

The principal object of our invention is the discovery of a process for obtaining greatly improved yields of the $C_{18}$ vicinally disubstituted cyclic acids from an acetylenic acid under conditions whereby appreciable thermal polymerization is avoided. Another object is a process whereby it is possible to isolate large amounts of a novel trienoic acid product whose drying oil properties closely resemble those of tung's cis-9-trans-11, trans-13-octadecatrienoic acid. The above and other objects will be appreciated more fully by reference to the following detailed disclosure and examples.

Crepenynic acid, which we have isolated in high yield from the seed oil of *Crepis foetida* and characterized as cis-9-octadecen-12-ynoic acid, has now been found to undergo an alkaline (potassium-t-butoxide) catalyzed rearrangement wherein methyl crepenynate is isomerized even at room temperature via a conjugated cis-enallenic intermediate which upon isolation and heating to about 100° C. surprisingly isomerizes in the absence of alkali to a mixture of conjugated trans,cis,trans- and conjugated trans,cis,cis-8,10,12-octadecatrienoic acids in yields of about 70 percent. The conjugated acids even in the absence of alkali are then thermally cyclized at 175–185° C. to the disubstituted cyclohexadiene acids in essentially quantitative yields that are undoubtedly enhanced by freedom from polymer formation at the low temperatures required for cyclization. Conventional isomerization techniques using sodium hydroxide and higher temperatures telescopes the indicated sequential reactions including cyclization, thereby preventing both the recognition and the isoaltion of the intermediate acyclic conjugated 8,10,12-octadecatrienoic acids. However, since Ligthelm et al. found no $C_{18}$ cyclic acid while Friedrich et al., JAOCS 40:584 (1963), requires temperatures of about 260° C. for cyclizing linolenic acid, one skilled in the art would not expect a di- or tri-unsaturated fatty acid to undergo cyclization even in the presence of relatively strong alkali at only moderately elevated temperatures, e.g., about 180° C. Thus, the telescoped alkali isomerization and cyclization of crepenynic acid shown in Example 2 is likewise unobvious and would be preferred when the isolated cis-enallenic intermediate is not required.

Example 1

Ground seeds of *Crepis foetida* were Soxhlet extracted overnight with petroleum ether (B.P. 30–60° C.). Removal of the solvent provided a 22.0 percent yield of oil. Mixed methyl esters were prepared by refluxing 141 g. of the oil with 1,100 ml. of ca. 4-percent HCl in methanol and 800-ml. benzene under nitrogen for 3 hours. The reaction mixture was concentrated, diluted with four volumes of water, extracted with ethyl ether, and the extract of mixed esters dried over anhydrous sodium sulfate: yield 137 g., analyzing 59.8-percent methyl crepenynate by gas-liquid chromatography. By countercurrent distribution using acetonitrile as the lower phase and n-hexane as the upper phase, there was obtained 67.5 g. of methyl crepenynate having a purity by gas-liquid chromatography of 99.7 percent. The absence of polymer or autoxiation products was confirmed by thin-layer chromatography on silica gel G plates. The methyl crepenynate gave the following analysis: Calcd. for $C_{19}H_{32}O_2$: C, 78.03; H, 11.03. Found: C, 77.8; H, 11.0.

Potassium-t-butoxide reagent was prepared by gradually adding an excess of metallic sodium to absolute t-butyl alcohol, refluxing for 1 hour, distilling the t-butyl alcohol, slowly adding 4.33 g. of potassium to 100 ml. of the dry alcohol, and permitting the stoppered flask to stand at room temperature overnight.

The potassium t-butoxide in t-butyl alcohol reagent (90 ml.) was added to a 0.50 g. sample of methyl crepenynate and the solution then stored at 1° C. overnight. The solidified reaction mixture was warmed to room temperature and allowed to isomerize for 4 hours before diluting with water, acidifying with dilute hydrochloric acid, extracting with ethyl ether, drying the extract, and removing the solvent. The thusly obtained ene-allenic conjugated triene product, i.e., cis-9,11,12-octadecatrienoic acid

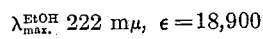

(0.46 g., 92 percent yield) showed a strong allenic absorption in the infrared (bands at 1,935 cm.$^{-1}$ and at 874 cm.$^{-1}$). Ultraviolet analysis gave $$\lambda_{max.}^{EtOH}\ 222\ m\mu,\ \epsilon = 18,900$$

and also 268 m$\mu$, $\epsilon$=3,800.

The alkali-free ene-allenic conjugated triene was heated at 100° C. under nitrogen, and infrared spectra determined periodically. The bands at 1,935 and 874 cm.$^{-1}$ had completely disappeared at about 100 minutes of heating on the bath coinciding with the complete conversion to the conjugated trans,cis,trans- and trans,cis,cis-8,10,12-octadecatrienoic acids. The temperature was increased to 180° C. for 40 minutes to permit cyclization to take place: Yield of $C_{18}$ cyclic acids 0.45 g. having a purity of 70 percent. The product displayed infrared absorption at 14.2$\mu$.

By comparison, the yield of mixed conjugated trienes of configurations unfavorable to cyclization from the prior art alkaline isomerization of ximenynic acid was only 27 percent.

Example 2

A 1.29 g. sample of pure methyl crepenynate was added to 250 ml. of a 10-percent solution of potassium hydroxide in the ethylene glycol at 185° C. in a reaction vessel equipped with ebullition means for the admission of a stream of nitrogen. At the end of 5 hours the reaction was stopped by diluting with water and acidifying with dilute hydrochloric acid. The acidified solution was extracted with diethyl ether, washed to neutrality with water, and the solvent removed to provide 1.16 g. of product whose infrared bands at 10.1$\mu$ and 14.2$\mu$ respectively indicated conjugated triene and cyclic acids. To permit separation and analysis, the product was then methylated by reaction with diazomethane and a 1.15 g. sample of the esterified material subjected to fractionation by urea adduct formation. Infrared analysis of the 0.20 g. of material thusly obtained from the urea adduct crystals indicated it to consist entirely of trans,trans,trans conjugated triene. The isolated nonadduct-forming component, 0.95 g., was shown by infrared and by gas-liquid chromatography to consist almost exclusively of the esterified cyclic acids with only a trace of conjugated triene.

Example 3

This example illustrates an alternative embodiment wherein the mixture of trans,cis,trans- and trans,cis,cis-8,10,12-octadecatrienoic acids can be isolated if desired and then thermally cyclized to the $C_{18}$ cyclic acids. To 2,000 ml. of a 10-percent solution of KOH in ethylene glycol were added 10 g. of methyl crepenynate. The reaction mixture was heated at 121° C. under a nitrogen atmosphere for 1 hour during which time the transient conjugated ene-allenic intermediate was formed and completely converted to the mixed octadecatrienoic acid isomers. The octadecatrienoic acids (9.70 g.; 97% yield) were recovered following neutralization of the reaction mixture with HCl, dilution with water, and extraction of the acids in ethyl ether. The mixed acids were then thermally cyclized to the $C_{18}$ cyclic acids as in Example 1 yielding 9.5 g. of crude cyclic acids having a GLC purity of 69 percent.

We claim:

1. A mixture consisting of about 2 parts of conjugated trans,cis,trans-8,10,12-octadecatrienoic acid and about 1 part of conjugated trans,cis,cis-8,10,12-octadecatrienoic acid.

2. A process for obtaining the octadecatrienoic acid mixture of claim 1 comprising:
   (a) subjecting a crepenynic acid member selected from the group consisting of cis-9-octadecen-12-ynoic acid and the methyl ester thereof to isomerization at room temperature in a t-butanol solution of potassium-t-butoxide for about 4 hours to form the corresponding conjugated ene-allenic triene intermediate;
   (b) isolating the said triene intermediate from the acidified isomerization mixture;
   (c) heating the isolated ene-allenic triene intermediate at about 100° C. under nitrogen and in the absence of alkali for about 100 minutes to convert the triene to a mixture consisting of about 2 parts of conjugated trans,cis,trans-8,10,12-octadecatrienoic acid and about 1 part of conjugated trans,cis,cis-8,10,12-octadecatrienoic acid.

References Cited

Ligthelm et al.: J. Chem. Soc. (London), 1952, 1088–93.

Friedrich et al.: J. Amer. Oil Chem. Soc. (1963), vol. 40, 584–87.

McLean et al.: Chem. Absts. (1956), vol. 50, cols. 8232–33.

ALEX MAZEL, *Primary Examiner.*

J. NARCAVAGE, *Assistant Examiner.*